United States Patent
Michelsen

(10) Patent No.: US 8,543,379 B1
(45) Date of Patent: Sep. 24, 2013

(54) SYSTEM AND METHOD FOR PARSING A TEXT BUFFER USING A GRAPHICAL USER INTERFACE

(75) Inventor: John J. Michelsen, Colleyville, TX (US)

(73) Assignee: Interactive TKO, Inc., Dallas, TX (US)

( * ) Notice: Subject to any disclaimer, the term of this patent is extended or adjusted under 35 U.S.C. 154(b) by 1360 days.

(21) Appl. No.: 11/328,421

(22) Filed: Jan. 9, 2006

Related U.S. Application Data

(60) Provisional application No. 60/642,003, filed on Jan. 7, 2005.

(51) Int. Cl.
*G06F 17/27* (2006.01)

(52) U.S. Cl.
USPC .......................................... 704/9

(58) Field of Classification Search
USPC .......................... 704/2, 4, 79, 7, 9
See application file for complete search history.

(56) References Cited

U.S. PATENT DOCUMENTS

| | | | |
|---|---|---|---|
| 5,485,618 A * | 1/1996 | Smith ........................... 715/710 |
| 5,798,757 A * | 8/1998 | Smith ........................... 715/709 |
| 6,353,840 B2 * | 3/2002 | Saito et al. .................... 715/202 |
| 6,557,011 B1 | 4/2003 | Sevitsky et al. ............ 707/104.1 |
| 6,601,018 B1 | 7/2003 | Logan ........................... 702/186 |
| 6,668,371 B2 | 12/2003 | Hamilton et al. ............. 717/125 |
| 6,684,387 B1 | 1/2004 | Acker et al. .................. 717/126 |
| 6,792,426 B2 | 9/2004 | Baumeister et al. ........... 707/10 |
| 6,826,716 B2 | 11/2004 | Mason ........................... 714/38 |
| 6,851,118 B1 | 2/2005 | Ismael et al. .................. 719/330 |
| 6,912,520 B2 | 6/2005 | Hankin et al. .................... 707/1 |
| 6,941,298 B2 | 9/2005 | Chow et al. ....................... 707/3 |
| 7,340,481 B1 * | 3/2008 | Baer et al. ........................... 1/1 |
| 2002/0095291 A1 * | 7/2002 | Sumner ......................... 704/270 |
| 2003/0014216 A1 * | 1/2003 | Lebow ........................... 702/179 |
| 2003/0078949 A1 * | 4/2003 | Scholz et al. ................. 707/505 |
| 2004/0039993 A1 * | 2/2004 | Kougiouris et al. .......... 715/513 |

OTHER PUBLICATIONS

LISA, 2.0 User's Guide, Interactive TKO, Feb. 27, 2003, pp. 1-130.
LISA, 2.0 Developer's Guide, Interactive TKO, Mar. 13, 2003, pp. 1-23.

* cited by examiner

*Primary Examiner* — Richemond Dorvil
*Assistant Examiner* — Olujimi Adesanya
(74) *Attorney, Agent, or Firm* — Patent Capital Group

(57) ABSTRACT

Systems, methods, apparatus and software can provide a graphical user interface for parsing text to create expressions. The expressions can be used to validate other text and/or to filter text. The user interface can display the subject text, and if appropriate, render a graphical view of the text based on the text, e.g., render a web page.

27 Claims, 5 Drawing Sheets

SYSTEM AND METHOD FOR PARSING A TEXT BUFFER USING A GRAPHICAL USER INTERFACE

This application claims the benefit, under 35 U.S.C. §119 (e), of U.S. Provisional Application No. 60/642,003, filed Jan. 7, 2005, entitled "Means of Validating and Parsing a Text Buffer with a Graphical User Interface," and naming John J. Michelsen as the inventor. The above-referenced application is hereby incorporated by reference herein in its entirety.

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

FIELD OF THE INVENTION

The present invention relates to systems and methods for parsing and validating text, and particular systems and methods that allow a user perform these operations using familiar user interfaces.

BACKGROUND OF THE INVENTION

Numerous aspects of using computer software require a user to be able to search for particular text in a text buffer, e.g., keywords, tags, data values, etc., and use resulting information (e.g., the text itself or information about its context) for some purpose, such as testing against expected values, making changes, debugging, and the like. In the most general sense, the text buffer is some memory or data structure in which the target text is stored, and upon which the user can operate with the assistance of suitable software. Potential sources of the text are numerous and include, for example, pure text files, mark-up language files, source code files, text captured from printed sources, text produced by other software, etc. Additionally, the text can exist in numerous well know formats, use standardized encodings (e.g., ASCII and Unicode), and be presented in various different languages.

Most techniques for manipulating text as described above include some type of parsing operation. In general, parsing involves dividing the text into small components that can be analyzed, sometimes referred to as lexical analysis, and determining the meaning of the components, sometimes referred to as semantic parsing. Of course, most types of text to be analyzed include some lexical information describing how the text should be broken into components or tokens, e.g., punctuation or other keys. For example, parsing this sentence would involve dividing it into words and phrases based on the spaces and punctuation, identifying the type of each component (e.g., verb, adjective, or noun), and then potentially determining more information about the components (e.g., a noun's meaning). Similarly, compiling high level computer language source code into executable machine code includes, among other steps, lexical analysis, e.g., characterizing text strings because they match known keywords, symbols, or data types for various computer language constructs, and semantic parsing, e.g., converting the entire sequence of tokens into a parse tree or other expression that describes the computer program's structure.

In the context of computer software testing, a user is often tasked with identifying certain text expressions in source code (e.g., code in a compiled language, scripting language, markup language, etc.), comparing text generated by other programs with expected values to determine proper operation of the programs, and otherwise automating the processing of text for some purpose. Often, the tools available to the user are either overly simplistic or overly complex.

For example, a simple tool familiar to most computer users is the basic text searching and replacing commands of programs such as text editors, word processors, and mark-up language browsers. These tools are relatively easy to use, but typically lack flexibility and sophistication. On the other hand, tools that employ so-called regular expressions are typically much more difficult to use. A regular expression is a string that describes or matches a set of strings, according to certain syntax rules. Regular expressions are used by many text editors and utilities to search and manipulate bodies of text based on certain patterns. Many programming languages support regular expressions for string manipulation. For example, Perl and Tcl both have a powerful regular expression engine built directly into their syntax. Regular expressions can also be used to compactly describe a set, without having to list all elements of the set. For example, the set containing the three strings Handel, Händel, and Haendel can be described by the pattern "H(ä|ae?)ndel" Most regular expression formalisms provide operations such as alternation, grouping, and quantification. While they are powerful, using regular expressions can require significant skill, i.e., familiarity with the supported operations and syntax, and experience in constructing bug-free expressions. Still other parsing techniques use similarly complicated scripting languages.

Accordingly, it is desirable to have tools and techniques for performing various aspects of text parsing operations that provide adequate power and flexibility, while still being easy to use.

SUMMARY OF THE INVENTION

It has been discovered that systems, methods, apparatus and software can provide a graphical user interface for parsing text to create expressions. The expressions can be used to validate other text and/or to filter text. The user interface can display the subject text, and if appropriate, render a graphical view of the text based on the text, e.g., render a web page.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

The present application makes use of the term "text" in its broadest sense. The text manipulated can take numerous different forms, be encoded according to various different standards, be present in different formats, conform with numerous different syntaxes, etc. Although the description below emphasizes examples based on text parsing tool operation in a software testing environment, the tools and techniques of the present application have broad applicability to any situation where it is useful to parse text, e.g., authoring text, compiling source code, automating text related processes, etc.

Figure 1:
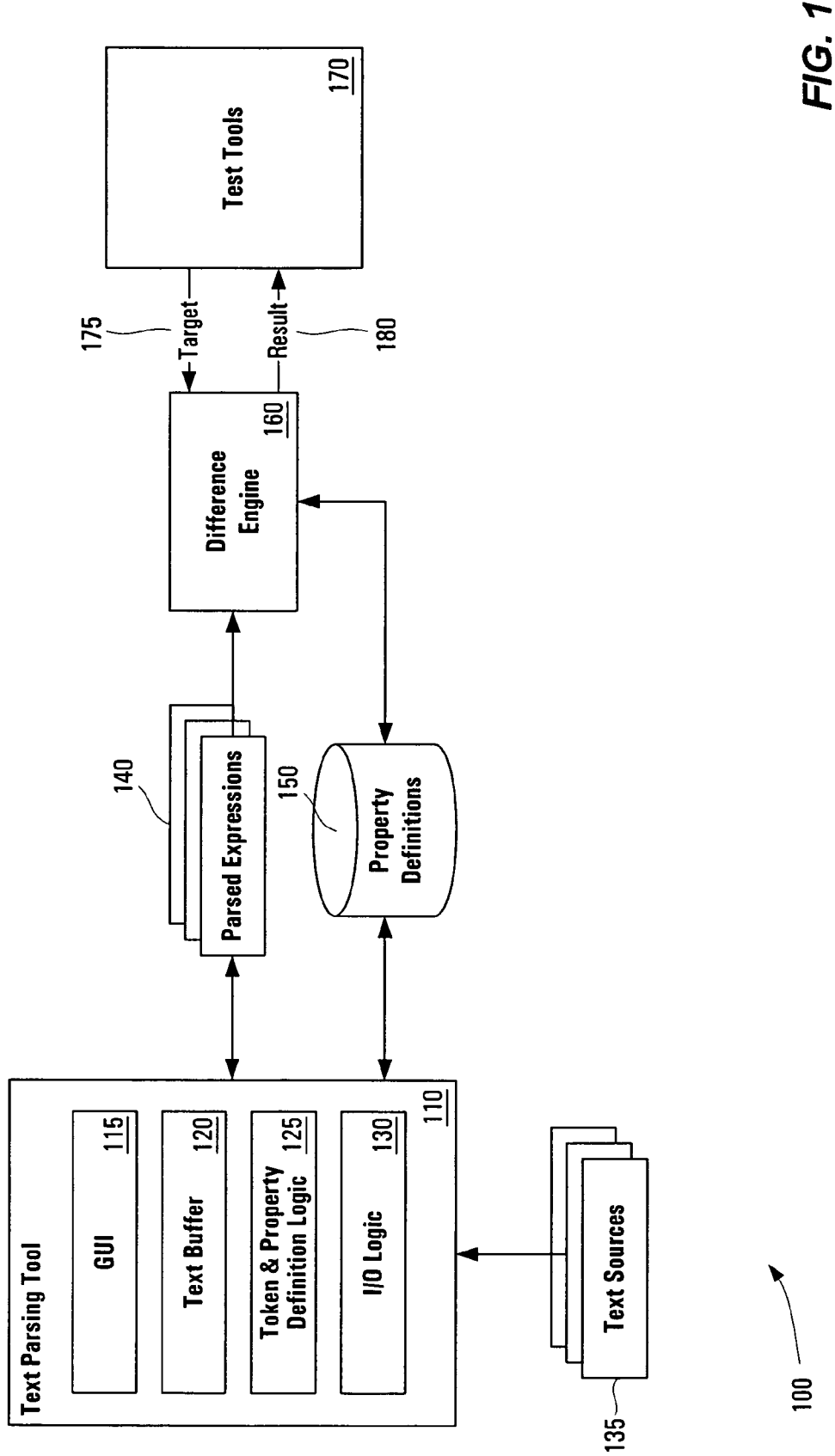
FIG. 1 illustrates a computing environment utilizing text parsing tools in accordance with the present invention.

FIG. 1 illustrates a computing environment utilizing the text parsing tools of the present invention. Computing system 100 various software components such as text parsing tool 110, difference engine 160, and test tools 170. The various software entities of FIG. 1 (e.g., 110-130, 160, and 170) are shown as separate software modules, objects, or programs. These various entities, and indeed any of the software described herein, can be variously combined into single software modules, implemented on separate computer systems, executed as separate threads on a single computer system, etc. Thus, the organization of the functional blocks and the hardware on which corresponding software is executed can be implemented in a variety of different ways as is well known in the art. In general, two or more of the various modules can execute on the same computer system, or on some combination of separate computer systems as desired. Such computer systems can be local to each other, remote to each other, or some combination of the two. One or more software components can be standalone programs, i.e., they are designed to execute on a specific hardware platform, or they may be designed to operate within a virtual machine such as the Java virtual machine or Microsoft's common language runtime (CLR). As a further example, the functionality of text parsing tool 110, difference engine 160 and/or test tools 170 can be integrated into a single program or testing suite. Moreover, text parsing tool 110 and difference engine 160 can be integrated into other types of applications, e.g., text editors, authoring tools, database management systems, productivity software, integrated development environments, and the like. The types of computer systems on which such software can be implemented are described below in conjunction with FIG. 5.

In one specific example, text parsing tool 110 and test tools 170 can all be part of a software testing package or environment such as the LISA™ 2.7 composite application testing software provided by ITKO, Inc. Such testing packages use text parsing tool 110 and other test tools to perform so-called "inline testing" to directly instrument and test key components of a distributed enterprise application. Thus, the various test tools can provide detailed analysis and test operation of objects, web services, websites, databases, middleware, and any other custom components. Numerous different types of testing enabled by these tools can, for example, include scenario-based testing, performance monitoring, integration testing, load testing, regression testing, and unit testing. As will be seen in greater detail below, text parsing tool 110 can be used as part of an iteratively test system that tests multiple objects, services, etc., of a distributed system under the control of a test case manager (e.g., implemented as part of test tools 170). Results from such testing can also be used by text parsing tool 110, i.e., a user can parse results of other tests. In still other examples, object interaction tool 110 is used in non-testing environments as described above.

In general, text parsing tool 110 presents a user with a graphical user interface for displaying text in the text buffer and defining tokens. In some embodiments, the user is also presented with a rendered view of that text buffer, e.g., if the text in the text buffer represents HTML, the rendered view presents that the rendered HTML based on the text. Whether or not there is a rendered view based on the text in the text buffer, the user experience can be described as "painting the screen" to establish parsing and validity checks. Visual feedback is provided that helps the user affirm the desired behavior. Once a text manipulation session is complete, parsing and validating information is persisted as desired or needed. Other programs, such as the testing tools 170 operating in conjunction with difference engine 160 will read and apply the desired validity and parsing expressions and provide a user with a result. A user can reload saved expressions to view or modify.

In some embodiments, text parsing tool 110 operates two different modes (or in combination). In a validation mode, the user applies an expression that was created to assert whether the tokens in the expression are still true on new text buffers that are checked with the expression created by text parsing tool 110. In parsing mode, a user can filter out content of the text buffer such that they can retrieve from the text buffer only the content that is desired. The desired content tokens are parsed from the page and stored in the properties.

Thus, computing system 100 generally, and text parsing tool 110 in particular, leverages the concept of properties or state. In general, a "property" as used in this context is a name-value pair used to identify a dynamic element. In a simple example, if a website login script is to be tested, instead of defining multiple versions of the relevant URL, each having the same host and script information, but differing by the actual values used for the username and password, a single URL expression can be constructed using properties such as USERNAME and PASSWORD. Testing logic can then be used to replace the specified property with an actual value. As this example illustrates, properties can be set explicitly using data sets. However, a property can also be established based on the return object from a method call. Further examples of the use of properties will be seen below in connection with FIGS. 3A-4B. Use of a properties system extends its value beyond that illustrated in the simple example above. Text parsing tool 110 can read and write name/value pairs into a program (or data structure) that is using this feature. At times, property values need to be fetched from a properties system and written or updated based on the mode in which text parsing tool 110 is executed.

Text parsing tool 110 includes various different types of functionality 115-130. This the modules may in fact be implemented as objects or components, or may be functional descriptions of the overall code base of text parsing tool 110.

Graphical user interface module 115 is the mechanism by which text parsing features and related information are presented to a user, and also the mechanism by which the user makes selections, configures expressions, inspects rendered views of text, and configures various aspects of tool operation. In many embodiments, graphical user interface 115 is implemented using well known user interface elements such as windows, buttons, pull down menus, slide-bars, text fields, icons, pointer icons (e.g., I-beam cursor insertion icons), file selection tools, tree representations, and the like. In some embodiments, a user can access text parsing tool 110 via a web server client or browser, e.g., text parsing tool 110 operates as an application server itself, and graphical user interface 115 is part of a web server that presents and HTML, Flash, etc., user interface. Thus, various different user interfaces or combinations of user interfaces can be used as is well known to those skilled in the art. Examples of text parsing tool user interface elements are shown in FIGS. 3A-4B, and their use is described in conjunction with the flow chart of FIG. 2. As these figures are merely example implementations, it should be recognized that numerous different interface configurations and techniques can be used to provide the described text parsing functionality and to render the viewers and editors in a graphical view.

Text buffer 120 is the data structure that stores the text being examined and for which expressions are defined. Using input/output logic 130, text is loaded into text buffer 120 from one or more text sources 135. As noted above, these text sources can take numerous forms, and can be provided in various different ways (e.g., local or remote files, network data streams, etc.). When changes are made, e.g., expressions are defined with respect to the text, the text buffer can be updated and new views rendered by graphical user interface 115.

Token and property definition logic 125 provides the routines for defining tokens in the text buffer, assigning certain tokens to properties, and recording this information as necessary. As part of this functionality, token and property definition logic 125 may prepare or read in parsed expressions 140 and property definitions 150. In so doing, token and property definition logic 125 can make use of existing infrastructure in computing system 100. For example, test tools 170 may utilize a properties system as described above, and so property definitions 150 may be part of that system. Parsed expressions 140 typically include, at a minimum, information describing the tokens defined using tool 110. As part of that description, parsed expressions may or may not include some or all of the text from the original text source. Alternately, parsed expressions 140 can include information about the original text source such as file location, data source, file type, etc.

Text parsing tool 110 can also include numerous other types of functionality, either as part of the modules illustrated or as part of other software modules not shown. For example, text parsing tool 110 will typically include logic for tool configuration, e.g., default values, preferences, and the like. Text parsing tool 110 can also monitor the user's activity to ensure that it conforms with certain requirements, e.g., that the user is defining tokens that are valid or otherwise usable by the system. The tool can warn a user of a violation of those requirements, or even a deviation from preferred practices. Since different tool features may or may not be available depending on the type of text in the buffer, e.g., rendering a browser view in either a window internal to the tool or a separate browser when the text is HTML, tool 110 may initially examine the source text (e.g., by file type) to determine which features are available. In other embodiments, separate instances of the tool will exist for different types of text. Still other associated features can be provides by logic not shown. Examples include: text editing features, basic search/replace features, regular expression features, intelligent text analysis features (e.g., displaying HTML tags in one color, script code in another color, etc.), and the like. Numerous other features can be integrated into text parsing tool 110 as will be understood by those skilled in the art.

In general, difference engine 160 is tasked with comparing one or more parsed expressions 140 with some target text 175 and returning some result 180. In the example illustrated, test tools 170 use difference engine 170 and defined expressions to derive some useful information. For example, test tool 170 might query a web server for an HTML page, and compare the resulting HTML code (e.g., target 175) against a parsed expression using difference engine 160. In other embodiments, the functionality of difference engine 160 is integrated into the corresponding test tool. However, in this example difference engine 160 is shown to be separate from test tools 170 because numerous different test tools might make use of the difference engine.

As previously noted, the parsed expressions defined using the text parsing tool can subsequently be used as part of a larger test of a distributed application, or at least a test of various components of a distributed application. In some embodiments, a particular use of the differencing functionality (e.g., an instance where difference engine 160 compares a target 175 against one or more parsed expressions to yield some result 180) represents one node (or a part of a node) among many nodes in a test chain. For example, a test case node can be an element test case chain that represents an instruction to perform one test action in a test case. The aforementioned LISA composite application testing software is an example of a testing tool (or set of testing tools) that executes such test cases built from nodes. Nodes can generally have any type of operation. One node might describe how to test a query against a database, while another tests the display of that information in a web page. Examples of node types supported by LISA include: dynamic Java execution, end test normally, EJB execution, external command execution (e.g., batch files, etc.), fail and end test, HTTP/HTML request, output log message, RMI server execution, raw SOAP request, read result from stream (e.g., file, URL, or classpath), SQL database execution, save property as last response, and web service execution. Although all nodes are not necessarily defined by or edited with a tool such as text parsing tool 110, many are. Moreover, those nodes that do can utilize the tool during the execution of the test case. For example, test execution can be suspended after executing a node describing an HTML request, the request results compared against an expression, and the test case can be re-executed.

In still other examples taken from the LISA testing environment, text parsing tool 110 is used as part of assertion and/or filter definition. Filters can be thought of as additional commands that a user wants applied before or after a particular test node executes. They typically perform that command on the response of the system under test. For example, filters can include parsed expressions or be defined using the text parsing tool so that they can be used to parse values from an HTML page or to perform conversions on the response. Similarly, an assertion is a code element that executes after a node and all its filters have executed, and verifies that the results returned match expectations. For example, a user might create an assertion for a database call node that ensures that only one row of the returned database information contains a specific username. If the results of the node contain only one row, the assertion changes causes the next node to execute. In this way, an assertion provides, for example, if..then type functionality.

Parsed expressions and property definitions are typically saved in some persistent form, representable in numerous different ways. In some embodiments, XML data schema are used, but numerous other schemes can be used, such as pure text, generated script code in any language, or binary forms of many kinds. Such persistence can be in the form of simple flat files, or more sophisticated forms such as a database maintained by a database management system. Thus, token and property definition logic 125 and/or I/O logic 130 can use simple file writing routines, database management systems (DBMS), etc., to load, save, and otherwise manage expression and property persistence. Examples of such DBMSs include IBM's DB2, Oracle Corporation's database management systems, Microsoft SQL Server, Sybase IQ, and the like, an can generally be relational or non-relational. Although schematically illustrated as a separate program/entity, persistence implementations can be integrated with other applications. Thus, an requisite persistence mechanisms can take numerous different forms, as will be understood by those skilled in the art.

Figure 2:
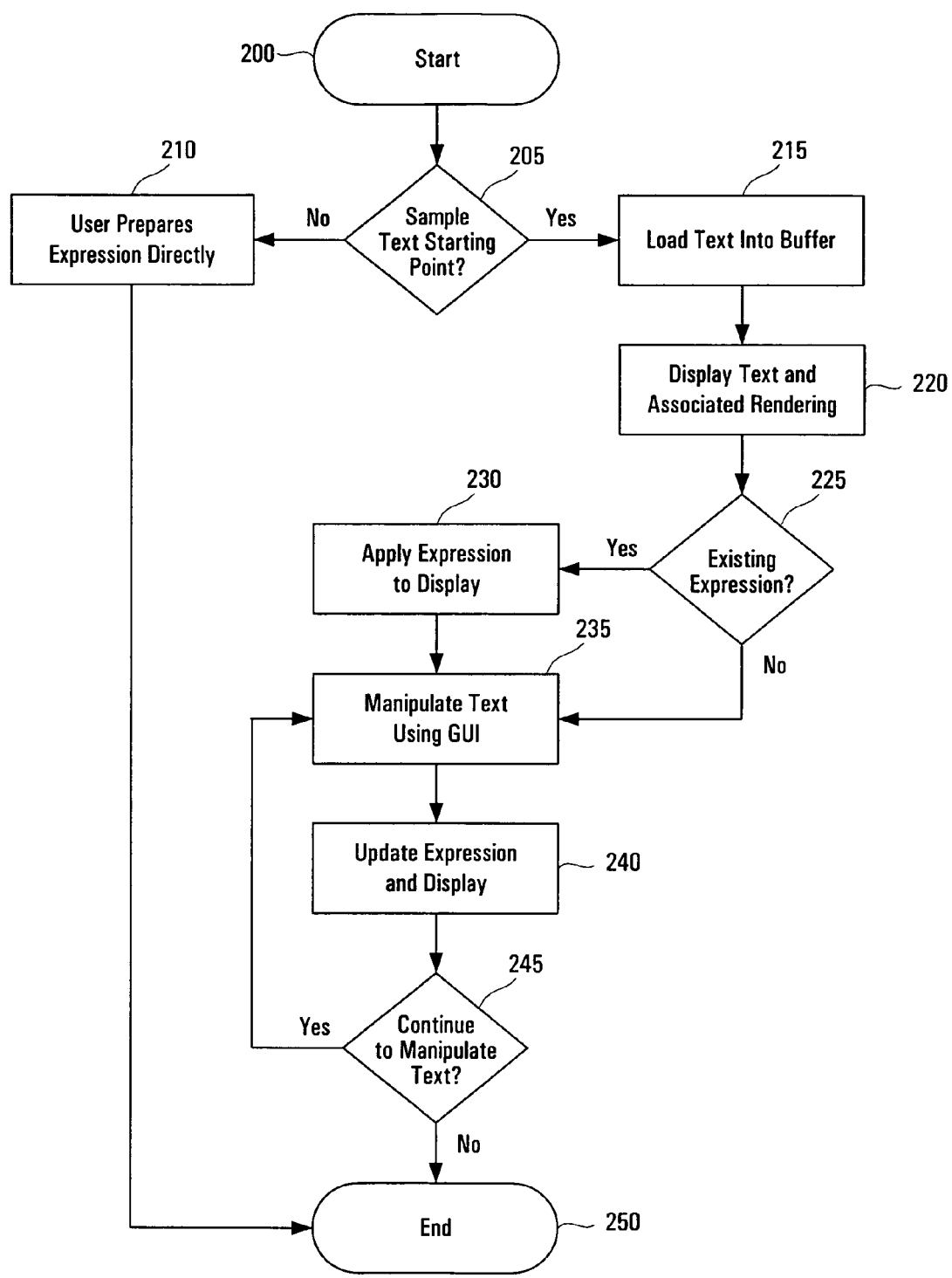
FIG. 2 is a flow chart illustrating operation of text parsing tools and techniques in accordance with the present invention.

FIG. 2 is a flow chart illustrating some of the steps performed to initiate and use text parsing tools and techniques in accordance with the present invention. Various operations illustrated in FIG. 2 will be further described with respect to corresponding graphical user interface elements shown in FIGS. 3A-4B. Operation begins at 200, where it is assumed that the text parsing tool is operating and necessary resources are generally available. Various different techniques can be used for allowing a user to execute the tool. For example, a user might explicitly execute the tool using a graphical user interface element, e.g., by selecting a menu item or clicking on an icon. A user might indirectly execute the tool by opening a document or operating a "wizard" process that causes execution of the text parsing tool. In still another example, the tool is executed by virtue of the fact that a predefined test scenario is being executed by a test system.

In 205, a determination is made whether some text exists as a starting point. In most cases, a user will begin with some existing text, and define relevant expressions based on that text sample. However, the same tool can be used to allow a user to directly define an expression without using a particular text sample loaded by the tool as a reference. Thus, if there is no specific text to be used by the tool as a starting point, operation transitions to 210. Here, the user prepares, views, and/or edits and existing expression directly. For example, a user could type in a small portion of text and then manipulate that text as described below. In still other embodiments, a user familiar with expression definition and/or the format in which the tool describes defined expressions can author one or more expressions directly. Once the user is finished preparing an expression, the process terminates at 250. Process termination is typically proceeded by some persistence operation, e.g., saving the defined expression, associated text, and/or information about properties associated with the expression.

If there is sample text to be used as determined in 205, operation transitions to 215 where that text is loaded into a text buffer. Text can be loaded from numerous sources and in numerous formats, as will be appreciated by those skilled in the art. The text to be loaded can be picked from a conventional file selection interface, copied and pasted from another application, captured from a stream of data, or generally extracted from any suitable source. As noted above, the text can undergo a preliminary analysis, such as identifying certain language constructs, formatting the text, determining the type of information described in the text (e.g., plain text, HTML, XML, etc.), and the like.

Once the text is loaded into a text buffer it is displayed in the tool using a graphical user interface (220). In some embodiments, no additional rendering is needed. For example, FIGS. 3A-3D illustrate an embodiment where the text is a list of files in a particular directory. Because this information does not describe a particular way to render some other image or display, no additional rendering of the text need be performed by the tool. In contrast, FIGS. 4A-4B illustrate and embodiment where the text is HTML code, and thus both the raw text and the rendered HTML code are displayed by the tool. In still other examples, there can be additional views, e.g., raw text, processed/formatted text, one or more rendered views, etc.

Next, a determination is made whether the text buffer already has an expression associated with it (225). If so, that expression is accessed and applied to the display in accordance with the graphical user interface of the tool (230). If there is no existing expression, operation transitions to 235 where a user uses the tool's graphical user interface to manipulate text, define expressions, and otherwise operate the text parsing tool.

Figure 3A:
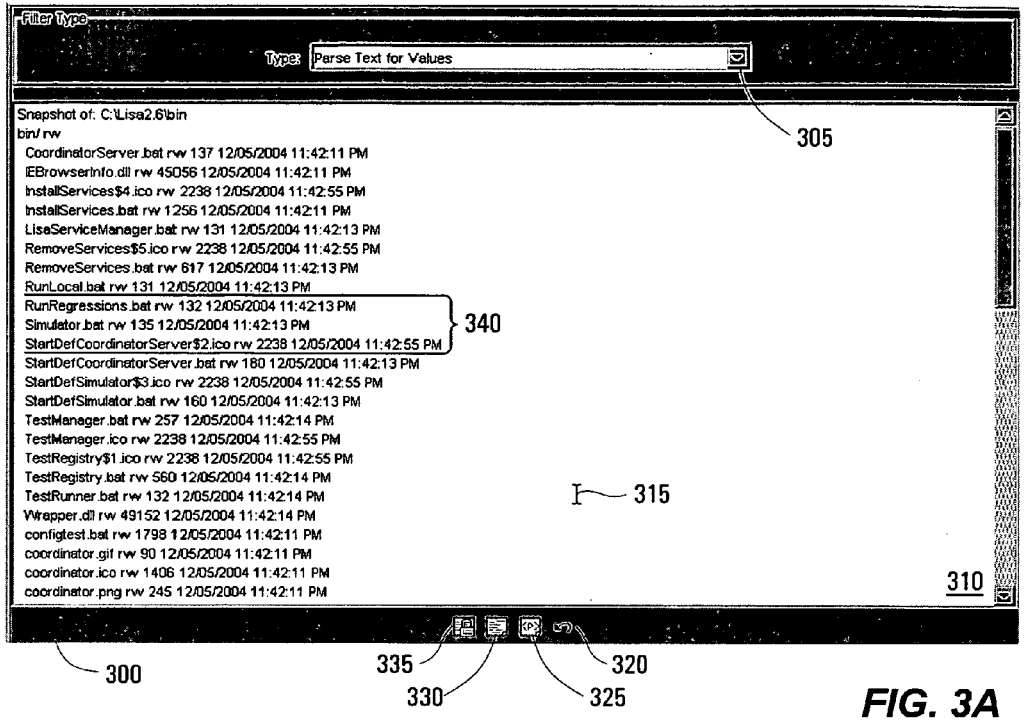
FIGS. 3A-3D illustrate examples of graphical user interface elements that can be used in for text parsing.
Figure 3B:
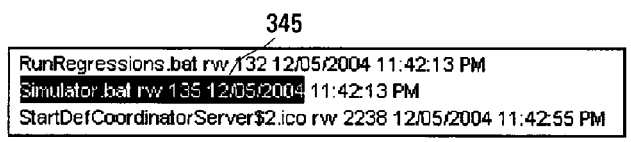
Figure 3C:
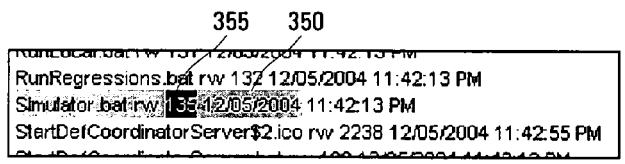
Figure 3D:
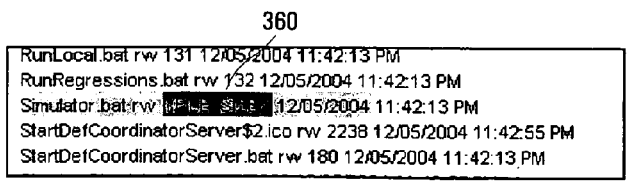
Figure 4A:
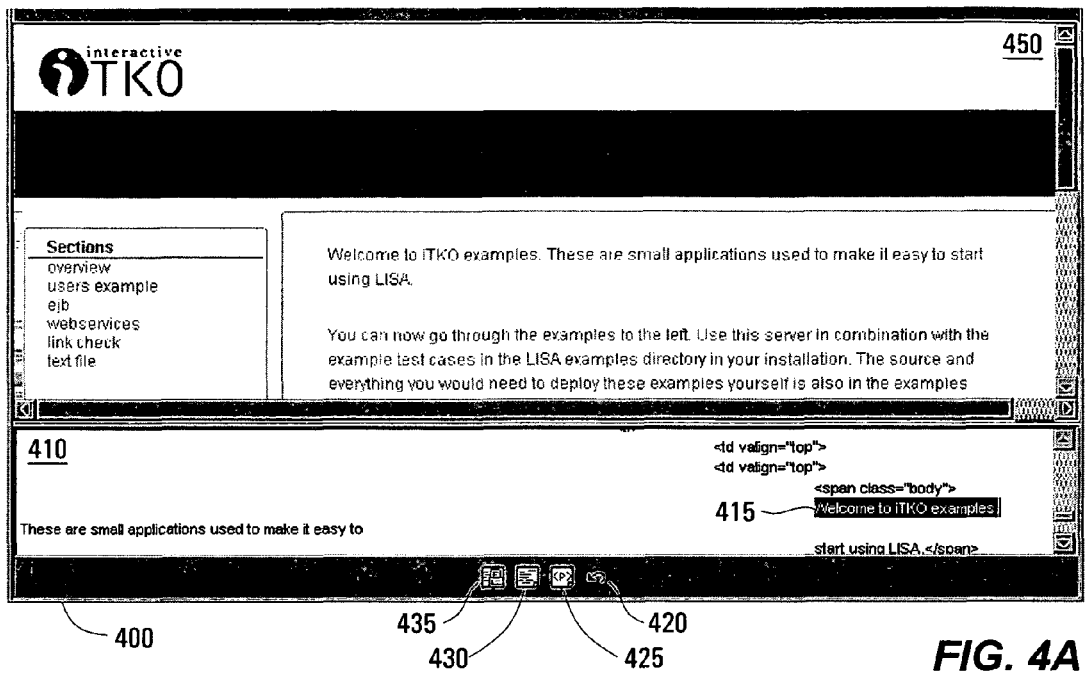
FIGS. 4A-4B illustrate still other examples of graphical user interface elements that can be used in for text parsing.
Figure 4B:
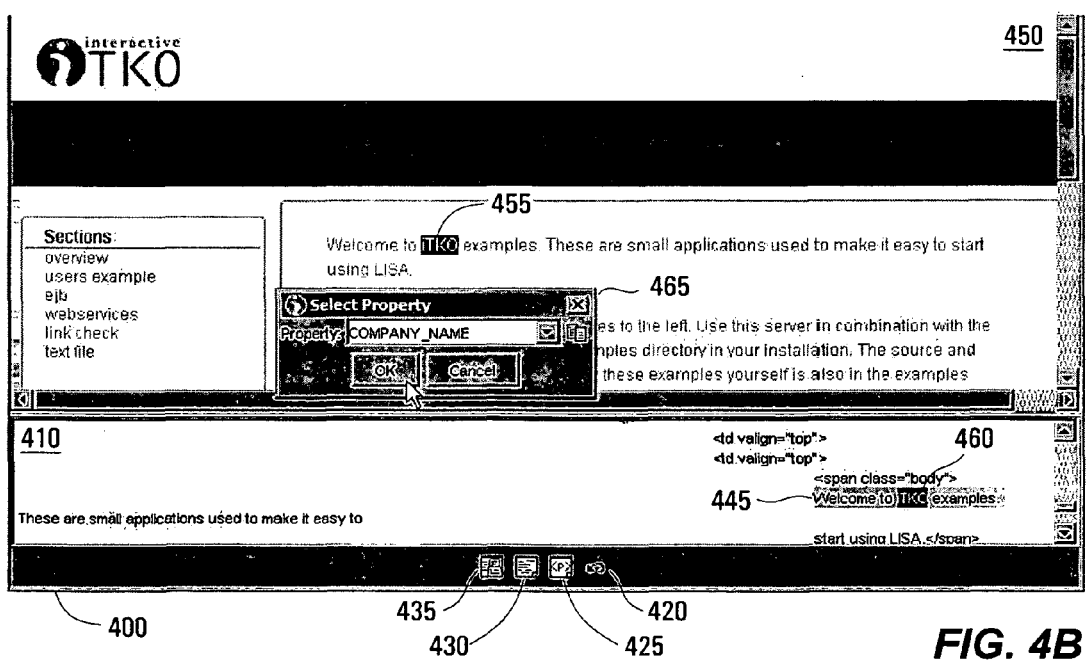

FIGS. 3A-3D illustrate many aspects of text manipulation and expression definition using the text parsing tool. Referring to FIG. 3A, an example display of the text parsing tool 300 is shown. In this example, tool functionality varies depending on the type of text used and the goal of the parsing operation. Thus, pull down menu 305 allows a user to select the particular type of operation desired, in this case "parse text for values." Panel 310 shows the text that has been loaded into the buffer and is available for manipulation and examination by the user. Conventional text editing/manipulating graphical user interface elements and techniques are enabled by tool 300. For example, a user uses I-beam insertion pointer 315 to place a cursor in the text, select text, etc., as is familiar to those skilled in the art. Again, the particular graphical user interface elements illustrated are merely exemplary, and numerous other graphical user interface elements can be used. Tool 300 also has a toolbar including various buttons 320-335 for performing aspects of expression definition. In FIGS. 3B-3D, reference is made to a particular portion of the text displayed in panel 310, i.e., text 340.

FIG. 3B illustrates the situation where a user has selected a portion of text 340 using the tool's graphical user interface. For example, a user has used a mouse to move I-beam insertion point 315 in a manner to select text portion 345. As is common with graphical user interfaces, select text portion 345 is displayed in a manner indicating it has been selected, e.g., it is highlighted by reverse display, underlining, alternate color presentation, etc. Since expression definition can include the process of defining relevant tokens from among the target text, a user can specify the type of token to assign the selected text by selecting one of the toolbar buttons 325-335.

As shown in FIG. 3C, previously selected text portion 345 has now been highlighted in a different manner (350) to indicate that the user has defined this text to represent a particular type of token. Specifically, a user has selected the "must" block button 335 to designate the selected portion of text as a "must" block. In this embodiment, must blocks represent text that must be present in any other text against which the expression will be compared. For example, if the user wants to analyze subsequent versions of the file "Simulator.bat" to make sure that its size has not changed, subsequent file directory snapshot text files (like that shown in 310) can be examined using the defined expression. In this case, the examined text must include the selected must block 350, i.e., the file name and the selected date. That the must block is required means that the expression generated will reflect the fact that this highlighted text must appear in this relative location in the text buffer.

FIG. 3C also demonstrates that previously defined tokens can be changed in whole or in part. For example, all of text 345 was initially defined to be a must block 350. However, the user has no selected a portion of must block 350, namely text portion 355, to define in some other manner. The user could use toolbar button 330 to reset the highlighted portion to an "any" token. An any token represents text that can take any value. As shown in FIG. 3D, a user has used toolbar button 325 to make highlighted portion 355 a property token 360. Thus, a user has requested that the selected content be parsed or validated against a property. For validation, the tool (e.g., using a difference engine) will check the content at that relative location to match with whatever the properties system contains as the value for the name given. For parsing, the property of the name given will be set with the value of the content in the text buffer.

In summary, it can be seen that a token is all the content of a given background color/shading in between different background colors/shadings. So, in the example of FIG. 3D, five tokens are shown: (1) the white background content up to the lightly shaded portion starting with "Simulator.bat"; (2) the lightly shaded region starting with "Simulator.bat"; (3) the more heavily shaded property region 360; (4) the second occurrence of lightly shaded content; and (5) the remaining white background content. The white background is an "any" token, so the content in the white background may be exactly what is shown, nothing at all, or different in any way possible. The lightly shaded background is a "must" token. Such content must be exactly as it is shown in the highlight. It does not have to be at exactly the same location as before (because there is an "any" block prior to it), but it does have to be exactly what is shown. The more heavily shaded token represents content in between the two "must" blocks, and is called a "property" token. The token name (FILE_SIZE in this example) will be the property name, and the content between the must blocks will be given the property name's value.

Numerous other token types can be defined. Moreover, tool 300 can be configured to enforce certain rules about token definition, e.g., warning a user when a defined token is unacceptable because it is too generic, restricting the location of certain tokens, etc. Other features can be supported by the tool as described above. One simple example is undo button 320 which allows a user to undo a previous token defining action. Other tool features will be known to those having ordinary skill in the art.

Returning to FIG. 2, changes made using the graphical user interface cause the expression definition to be updated and any associated changes made to the display 240. If the user desires to continue to manipulate text and define expressions, as determined in 245 (e.g., as evidenced by continuing to manipulate the user interface as described), the process flow returns to 235. If instead, the interaction is completed, and the process terminates at 250. Termination typically occurs after relevant information is persisted in some form, or when the user chooses not to save the expressions defined.

FIGS. 4A-4B illustrate still other aspects of text manipulation and expression definition using the text parsing tool. Referring to FIG. 4A, another example display of the text parsing tool 400 is shown. In this example, tool functionality varies depending on the type of text used and the goal of the parsing operation. Thus, because the subject text is HTML, two panels are displayed: panel 410 showing the text that has been loaded into the buffer and is available for manipulation and examination by the user, and panel 450 showing a rendered view of the text in the buffer (e.g., the HTML as displayed by a web browser). Conventional text editing/manipulating graphical user interface elements and techniques are enabled by tool 400. However, the presence of the split-view allows additional manipulation. Existing expressions can be shown in both the text panel and the rendered view panel. Instead of merely making selections in the text buffer, a user can make selection in the rendered view and corresponding selections will appear in the text buffer display. The user can also use the rendered view as a key to finding desired locations in the text buffer, e.g., clicking on a portion of the rendered view will advance the text buffer display to that portion of the text buffer. In general, changes made in one view can be reflected in the other, or not. The user is generally provided with a graphical means to make edits directly on the screen in the text buffer or its rendered view based on the display's capabilities, and including mouse commands, menu commands, command keys, and other types of interface interaction.

Thus, FIG. 4A illustrates a toolbar having various buttons 420-435 for performing aspects of expression definition, much as is the case for tool 300. Additionally, text is selected (415) in a similar manner. FIG. 4B illustrates how the selection of text 455 in rendered view panel 450 causes corresponding text 460 to be selected in text buffer view 410. Note that in this example, previously selected text 415 has been turned into a must token 445 using toolbar button 435. FIG. 4B also illustrates the process of defining a property. Here, a user has selected toolbar button 425 to define selected text 455/460 as a property. This brings up select property window 465 where the user can provide a property name (e.g., COMPANY_NAME) or select an existing property name. Note that property features can vary according to the manner in which the text parsing tool is used. For example, in the so-called validation mode, a user selects content and asserts that the content selected may change, but only change into the value that is associated with the property given. For the parsing mode, a user selects the content that the user wants read from the text buffer in the future. That content will be stored in the properties system under the given property name. Numerous variations can also be implemented. For example, other transformations of the content are possible beyond the properties system shown. Upper/lower case, phonetic matching, location on screen, size or position, and a number of other validation and parsing commands can be implemented using the tools and techniques of the present invention.

The flow charts of FIG. 2 illustrates some of the many operational examples of text parsing tool usage disclosed in the present application. Those having ordinary skill in the art will readily recognize that certain steps or operations illustrated in FIG. 2 can be eliminated or taken in an alternate order. Moreover, the methods described throughout this application (including FIG. 2) are typically implemented as one or more software programs encoded in a computer readable medium as instructions executable on a processor. The computer readable medium can be any one of an electronic storage medium, a magnetic storage medium, an optical storage medium, and a communications medium conveying signals encoding the instructions. Separate instances of these programs can be executed on separate devices in keeping with the methods described above. Thus, although certain steps have been described as being performed by certain devices, software programs, processes, or entities, this need not be the case and a variety of alternative implementations will be understood by those having ordinary skill in the art.

Figure 5:
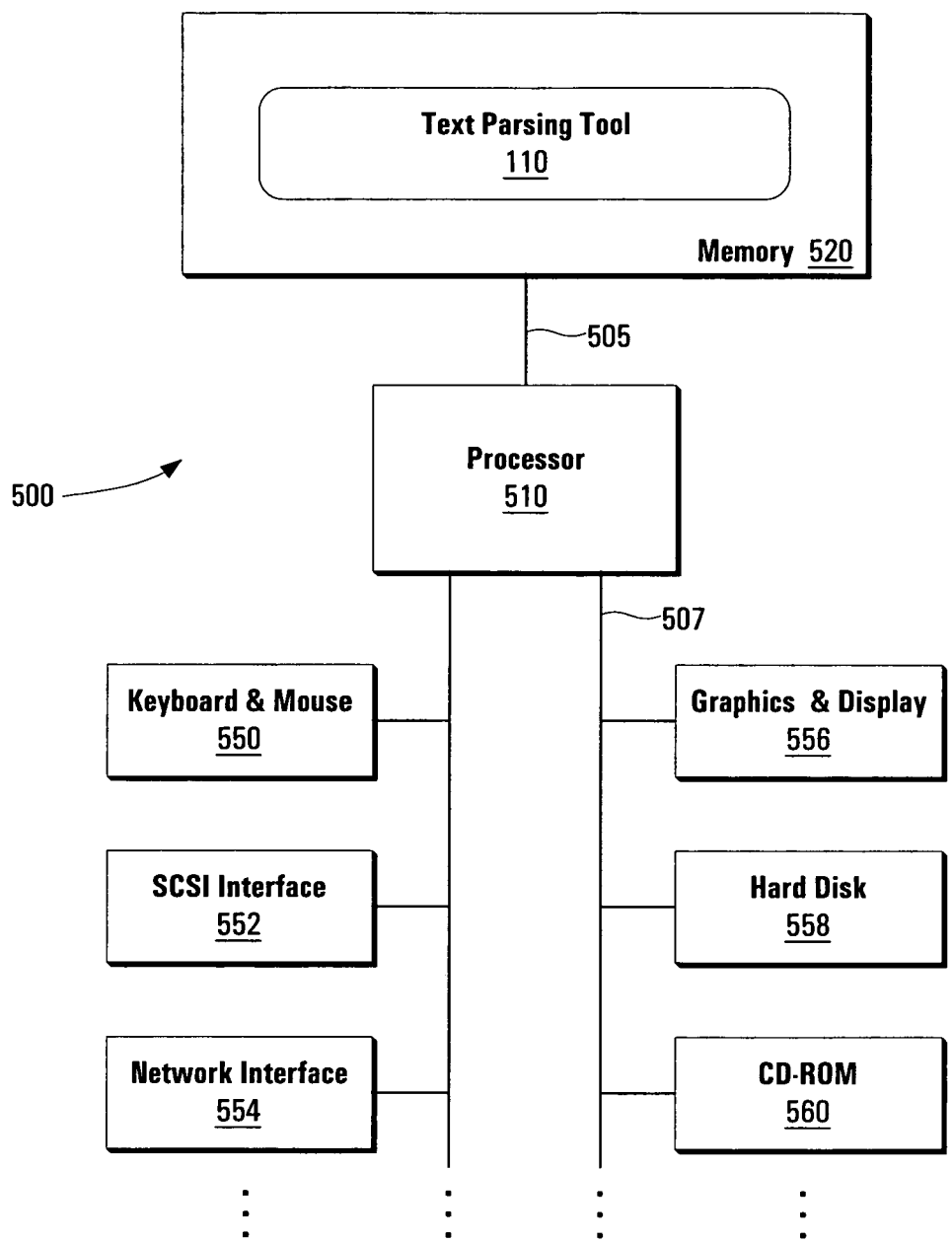
FIG. 5 is a simplified block diagram of a computer system for implementing the techniques of the present invention.

FIG. 5 illustrates a block diagram of a computer system 500 for implementing the techniques of the present invention. For example, computer system 500 can be an embodiment of one of the previously described servers or client computer systems. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor and or data, e.g., 110. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, computer languages such as C, C++, C#, Java, JavaScript, VBScript, JScript, PHP, and CLI/CLR. Additionally, software 110 can be provided to the computer system via a variety of computer readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Computer system 500 also includes devices such as keyboard & mouse 550, SCSI interface 552, network interface 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown.

Although the present invention has been described with respect to specific embodiments thereof, various changes and modifications may be suggested to one skilled in the art and it is intended that the present invention encompass such changes and modifications as fall within the scope of the appended claims.

What is claimed is:

1. A method comprising:
    loading first text data into a text buffer, the first text data comprising a plurality of text characters;
    presenting the first text data in a graphical user interface;
    receiving a first user selection of a first set of characters in the first text data selected via the graphical user interface;
    receiving a first user request to define the selected first set of characters in the first text data as a must token, wherein the first user request includes user selection of a must type from a plurality of token types via the graphical user interface;
    receiving a second user selection of a second set of characters in the first text data selected via the graphical user interface;
    receiving a second user request to define the selected second set of characters in the first text data as a property token, wherein the second user request includes user selection of a property from the plurality of token types via the graphical user interface and designation of a property name corresponding to the selected second set of characters; and
    defining an expression including the defined must token and defined property token, wherein the must type identifies that the first selected set of characters in the first text data must be included within other text data evaluated against the expression and the property type identifies that other text portions corresponding to the second selected set of characters in other text data evaluated against the expression correspond to a value in a property name/value pair.

2. The method of claim 1 wherein the first text data further comprises at least one of: ASCII text, Unicode text, mark-up language text, scripting language text, or computer language text.

3. The method of claim 1 further comprising:
    rendering a graphical representation of the first text data; and
    displaying both the graphical representation of the first text data and the unrendered first text data.

4. The method of claim 1 wherein the must type is selected from the plurality of token types using a first graphical user interface element and the property type is selected from the plurality of token types using a second graphical user interface element and at least one of the first graphical user interface element and the second graphical user interface element further comprises at least one of: a window, a panel, a button, a toolbar, a pull down menu, a slide-bar, a text field, an icon, pointer icon, a file selection tool, a tree representations, or a shaded selection region.

5. The method of claim 1 wherein the plurality of token types further comprises:
    an any type, wherein content compared against text included in an any type token can be exactly what is selected for the any type token, nothing at all, or any other text;
    the must type, wherein content compared against a must type token must be exactly as selected for the must type token; or
    the property type, wherein a property type token is associated with one or more name/value pairs, and wherein content compared against the property type token during a validation mode must equal a value stored in one of the one or more name/value pairs.

6. The method of claim 1 wherein the expression includes a plurality of tokens including the must token and property token, and wherein the expression indicates that a first one of the plurality of tokens is ordered before a second one of the plurality of tokens.

7. The method of claim 1 further comprising:
    evaluating the expression against particular text to determine whether the particular text satisfies the expression.

8. The method of claim 1 further comprising:
    evaluating the expression against particular text to identify a particular portion of the particular text as a value in the property name/value pair.

9. The method of claim 1, further comprising:
    presenting a first graphical effect to the first set of characters in the presented first text data in response to the first user request to define the selected first set of characters as a must token; and
    presenting a second, different graphical effect to the second set of characters in the presented first text data in response to the second user request to define the selected first set of characters as a property token.

10. The method of claim 9, wherein the first and second graphical effects include highlighting of the first and second sets of characters respectively, wherein the first set of characters is highlighted in a first color and the second set of characters is highlighted in a second color.

11. The method of claim 1, wherein the second set of characters in the first text data overlaps and includes at least one text character in the first set of characters.

12. A non-transitory computer readable medium comprising program instructions executable on a processor to perform operations comprising:

displaying first text data stored in a text buffer using a graphical user interface, the first text data comprising a plurality of text characters;

receiving a first user selection of a first set of characters in the first text data selected via the graphical user interface;

receiving a first user request to define the selected first set of characters in the first text data as a must token, wherein the first user request includes user selection of a must type from a plurality of token types via graphical user interface; and receiving a second user selection of a second set of characters in the first text data selected via the graphical user interface;

receiving a second user request to define the selected second set of characters in the first text data as a property token, wherein the second user request includes user selection of a property from the plurality of token types via the graphical user interface and designation of a property name corresponding to the selected second set of characters; and defining an expression including the defined must token and defined property token, wherein the must type identifies that the first selected set of characters in the first text data must be included within other text data evaluated against the expression and the property type identifies that other text portions corresponding to the second selected set of characters in other text data evaluated against the expression correspond to a value in a property name/value pair.

13. The computer readable medium of claim 12 wherein the first text data further comprises at least one of: ASCII text, Unicode text, mark-up language text, scripting language text, or computer language text.

14. The computer readable medium of claim 12 further comprising instructions for:

rendering a graphical representation of the first text data; and displaying both the graphical representation of the first text data and the unrendered first text data.

15. The computer readable medium of claim 12 wherein the must type is selected from the plurality of token types using a first graphical user interface element and the property type is selected from the plurality of token types using a second graphical user interface element.

16. The computer readable medium of claim 12 wherein the plurality of token types further comprises:

an any type, wherein content compared against text included in an any type token can be exactly what is selected for the any type token, nothing at all, or any other text;

the must type, wherein content compared against a must type token must be exactly as selected for the must type token; or the property type, wherein a property type token is associated with one or more name/value pairs, and wherein content compared against the property type token during a validation mode must equal a value stored in one of the one or more name/value pairs.

17. The computer readable medium of claim 12 wherein the expression includes a plurality of tokens including the must token and property token, and wherein the expression indicates that a first one of the plurality of tokens is ordered before a second one of the plurality of tokens.

18. The computer readable medium of claim 12 further comprising instructions for:

evaluating the expression against particular text to determine whether the particular text satisfies the expression.

19. The computer readable medium of claim 12 further comprising instructions for:

evaluating the expression against particular text to identify a particular portion of the particular text as a value in the property name/value pair.

20. A system comprising:

at least one processor;

at least one computer-readable memory device storing data including text data; and a text parsing tool coupled to retrieve text data from the at least one computer-readable memory device, wherein the text parsing tool is configured to:

load first text data into a text buffer, the first text data comprising a plurality of text characters;

present the first text data in a graphical user interface;

receive a first user selection of a first set of characters in the first text data selected via the graphical user interface;

receive a first user request to define the selected first set of characters in the first text data as a must token, wherein the first user request includes user selection of a must type from a plurality of token types via the graphical user interface;

receive a second user selection of a second set of characters in the first text data selected via the graphical user interface;

receive a second user request to define the selected second set of characters in the first text data as a property token, wherein the second user request includes user selection of a property from the plurality of token types via the graphical user interface and designation of a property name corresponding to the selected second set of characters; and define an expression including the defined must token and defined property token, wherein the must type identifies that the first selected set of characters in the first text data must be included within other text data evaluated against the expression and the property type identifies that other text portions corresponding to the second selected set of characters in other text data evaluated against the expression correspond to a value in a property name/value pair.

21. The system of claim 20 wherein the first text data further comprises at least one of: ASCII text, Unicode text, mark-up language text, scripting language text, or computer language text.

22. The system of claim 20 wherein the text parsing tool is further configured to:

render a graphical representation of the first text data; and display both the graphical representation of the first text data and the unrendered first text data.

23. The system of claim 20 wherein the plurality of token types further comprises:

an any type, wherein content compared against text included in an any type token can be exactly what is selected for the any type token, nothing at all, or any other text;

the must type, wherein content compared against a must type token must be exactly as selected for the must type token; or the property type, wherein a property type token is associated with one or more name/value pairs, and wherein content compared against the property type token during a validation mode must equal a value stored in one of the one or more name/value pairs.

24. The system of claim 20 further comprising:
a persistent storage device, wherein the persistent storage device stores the expression, and wherein the expression includes a plurality of tokens including the must token and property token, and wherein the expression indicates that a first one of the plurality of tokens is ordered before a second one of the plurality of tokens.

25. The system of claim 20 further comprising:
a difference engine, wherein the difference engine is configured to evaluate the expression against particular text to determine whether the particular text satisfies the expression.

26. The system of claim 20 wherein the text parsing tool is further configured to:
evaluate the expression against particular text to identify a particular portion of the particular text as a value in the property name/value pair.

27. A method comprising:
loading first text data into a text buffer;
presenting the first text data in a graphical user interface;
receiving a first user selection of a first portion of the first text data selected via the graphical user interface;
receiving a first user request to define the selected first portion of the first text data as a must token, wherein the first user request includes user selection of a must type from a plurality of token types via the graphical user interface;
receiving a second user selection of a second portion of the first text data selected via the graphical user interface;
receiving a second user request to define the selected second portion of the first text data as a property token, wherein the second user request includes user selection of a property from the plurality of token types via the graphical user interface and designation of a property name corresponding to the selected second portion;
defining an expression including the defined must token and defined property token, wherein the must type identifies that the first selected portion of the first text data must be included within other text data evaluated against the expression and the property type identifies that other text portions corresponding to the second selected portion in other text data evaluated against the expression correspond to a value in a property name/value pair;
presenting a first graphical effect to the first portion of the presented first text data in response to the first user request, the first graphical effect identifying the first portion as having been selectively defined as a must token; and
presenting a second, different graphical effect to the second portion of the presented first text data in response to the second user request, the second graphical effect identifying the second portion as having been selectively defined as a property token.

\* \* \* \* \*